United States Patent
Jupiter et al.

[15] 3,679,167
[45] July 25, 1972

[54] DEVICE FOR FORMING HAMBURGER PATTIES

[72] Inventors: Bernard Jupiter, 184 Albermarle Ave., Levittown, N.Y. 11756; Harry D. Kazakowitz, 18 Fortree Lane, East Meadow, N.Y. 11554

[22] Filed: June 9, 1970

[21] Appl. No.: 44,763

[52] U.S. Cl. .................................249/173, 17/32
[51] Int. Cl. .........................A22c 7/00, B29c 1/00
[58] Field of Search....................17/32; 249/173

[56] References Cited

UNITED STATES PATENTS

| | | |
|---|---|---|
| 884,502 | 4/1908 | Kyser.................................249/173 X |
| 3,340,798 | 9/1967 | Winger...................................17/32 X |
| 3,453,692 | 7/1969 | Fukuyama.........................249/173 X |
| 1,117,204 | 11/1914 | Lorenz...............................249/173 X |

*Primary Examiner*—J. Spencer Overholser
*Assistant Examiner*—Lucius R. Frye
*Attorney*—Jacob L. Kollin

[57] ABSTRACT

Device for forming hamburger patties, comprising an elongated container of resilient material. The container has a longitudin slit defined by a pair of flanges bent outwardly. Clamping means for locking the edge portions in intimate engagement are provided. A pair of removable closure disks for the ends of the container are received in outwardly extending shoulders formed at the ends of the container. One of the shoulders is of rectangular cross-section, to permit the axial displacement of one of the closure disks, when ground meat is frozen in the container. The frozen meat piece is removed from the container and is sliced transversely into hamburger patties of desired thickness.

2 Claims, 2 Drawing Figures

PATENTED JUL 25 1972 3,679,167
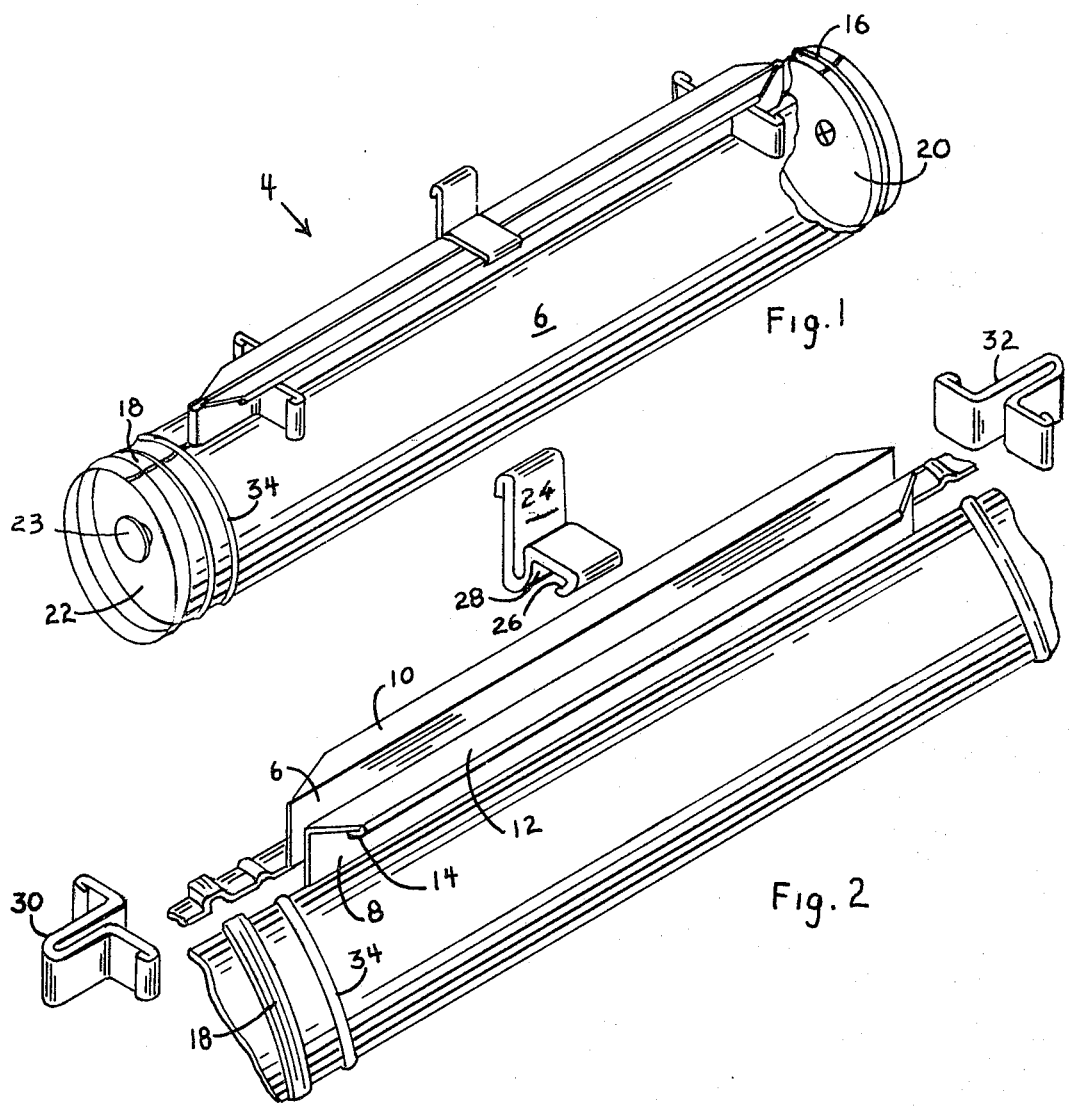
INVENTORS:
BERNARD JUPITER
HARRY D. KAZAKOWITZ
by *Trent L. Collin*
ATTORNEY

DEVICE FOR FORMING HAMBURGER PATTIES

BACKGROUND OF THE INVENTION

This invention relates to a food molds in general and to a food mold for forming hamburger patties, in particular.

An object of the present invention is to provide a device for forming a plurality of meat patties of uniform size and shape in a simple manner.

Another object of the invention is to provide a device of the above character which will permit the patties thus formed to be stored in any of the various types of refrigeration units in preparation for subsequent immediate use.

A further object of the invention is to provide a device of the above character which will permit the formation of patties of uniform quality and will afford assurance that all persons purchasing the patties will receive appropriate portions.

Still another object of the invention is to provide a simple and durable container mold in which ground hamburger meat may be placed and removed in a simple manner.

Yet another object of the invention is to provide a device of the above character which will meet sanitary requirements.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing the preferred embodiment is shown.

In the drawing:

FIG. 1 is a perspective view, partly broken away, of the device, shown in closed position and FIG. 2 is a partial perspective view of the device in open position.

Referring now to the drawing in detail, the device, generally indicated by the numeral 4, comprises a cylindrical longitudinally slit container, preferably of springy stainless steel, formed with a pair of radially extending integral flanges, 6 and 8, terminating in a pair of integral outwardly extending lips 10 and 12, respectively, disposed angularly to the flanges 6 and 8. The outer edges of the lips are bent under, as shown at 14, to provide rigidity to said lips. One end of the container, 6 is formed with an outwardly extending split U-shaped annular shoulder 16 for receiving a closure disk 20. The other end of the container is formed with an outwardly extending rectangular shoulder 18, about one-half to 1 inch wide, for receiving a closure disk 22, to permit its axial displacement in said rectangular shoulder. Both disks are provided with knobs, such as 23. An L-shaped locking clamp 24, formed with a hook portion 26 and a flat portion 28 is provided for locking in intimate engagement the flanges 6 and 8, as shown in FIG. 1. There are further provided a pair of T-shaped clamps 30 and 32, slidable over the respective end portions of flanges 6 and 8 for further securement of the flanges after these have been clamped together by the L-shaped clamp 26, as shown in FIG. 1. There is additionally provided an indented peripheral groove 34 at said other end of the container, for a purpose to be described later.

To form meat patties, the container 6 is stuffed with ground meat, while in open condition, shown in FIG. 2, to the marking 34. The closure disks 20 and 22 are positioned in the respective shoulders 16 and 18. The flanges 6 and 8 are brought together and clamped by clamp 24, as shown in FIG. 1. The T-shaped clamps 30 and 32 are slid over the respective flanges 6 and 8, thus firmly locking the latter in intimate engagement. The container 6, with the ground meat stuffed therein, is placed in a freezer and kept therein, until the ground meat is completely frozen. The container space between the groove 34 and closure disk 22, permits the ground meat in the container to expand while freezing, the disc being axially displaceable in shoulder 18.

After the meat has been frozen, the container 6 is opened by removing the clamps 24, 30, 32 and the closure disks 20 and 22. The frozen meat, formed in the shape of a cylinder is pushed out of the open container and cut transversely by appropriate means, such as a butcher's band saw or the like into hamburger patties of desired thickness.

While the container has been illustrated and described as cylindrical, it might, of course, be octagonal, square or of any other plastic, aluminum or other suitable material.

We claim:

1. Device for forming hamburger patties, comprising in combination, an elongated container of resilient material having a slit extending longitudinally thereof, defined by a pair of edge portions, and formed with a pair of open end portions, a pair of removable closures for said open end portions and clamping means for locking said edge portions in intimate engagement and said closures in said end portions, said edge portions being formed as radially extending flanges terminating in a pair of outwardly extending lips, said clamping means comprising an L-shaped clamp formed with a hook portion engageable with one of said lips and a flat portion engageable with the other of said lips, said clamping means further comprising a pair of U-shaped clamps slidable over said radially extending flanges, one of said open end portions being formed with an outwardly extending U-shaped shoulder for receiving one of said closures, the other of said open end portion being formed with an outwardly extending shoulder of rectangular cross-section for displaceably receiving the other of said closures.

2. Device according to claim 1, wherein said other end portion is further provided with a peripheral groove spaced from said shoulder of rectangular cross section, for indicating the limit of an amount of ground meat to be stuffed in said container.

* * * * *